United States Patent
Sugimoto

(10) Patent No.: US 6,571,072 B1
(45) Date of Patent: May 27, 2003

(54) IMAGE FORMING METHOD

(75) Inventor: Shinya Sugimoto, Kawasaki (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/011,235

(22) Filed: Dec. 7, 2001

(51) Int. Cl.[7] ............................ G03G 15/00; H04N 1/40
(52) U.S. Cl. ........................ 399/81; 358/448; 399/382
(58) Field of Search .......................... 399/75, 81, 382, 399/407; 358/1.18, 448, 452, 453; 345/339, 342, 352, 354

(56) References Cited

U.S. PATENT DOCUMENTS 5,210,622 A        5/1993  Kelley et al. ............... 358/451
5,337,161 A   *    8/1994  Hube .......................... 358/448
6,072,484 A   *    6/2000  Kuroda ........................ 345/339
6,452,694 B1  *    9/2002  Eisenberg et al. .......... 358/1.18

FOREIGN PATENT DOCUMENTS

JP              4-298369         10/1992

* cited by examiner

*Primary Examiner*—Hoan Tran
(74) *Attorney, Agent, or Firm*—Foley & Lardner

(57) ABSTRACT

A method for printing a tab heading on a tab portion of a paper includes displaying an initial menu on an operation panel, allowing pressing of a tab button on a second menu, allowing pressing of a tab-layout button on a third menu, allowing input of contents of the tab heading on a fourth menu, allowing setting of a tab-size and a number of tabs on a fifth menu, and printing the tab heading on the tab portion of the paper based on the layout of the tab heading, the contents of the tab heading, the tab size, and the number of tabs.

9 Claims, 5 Drawing Sheets

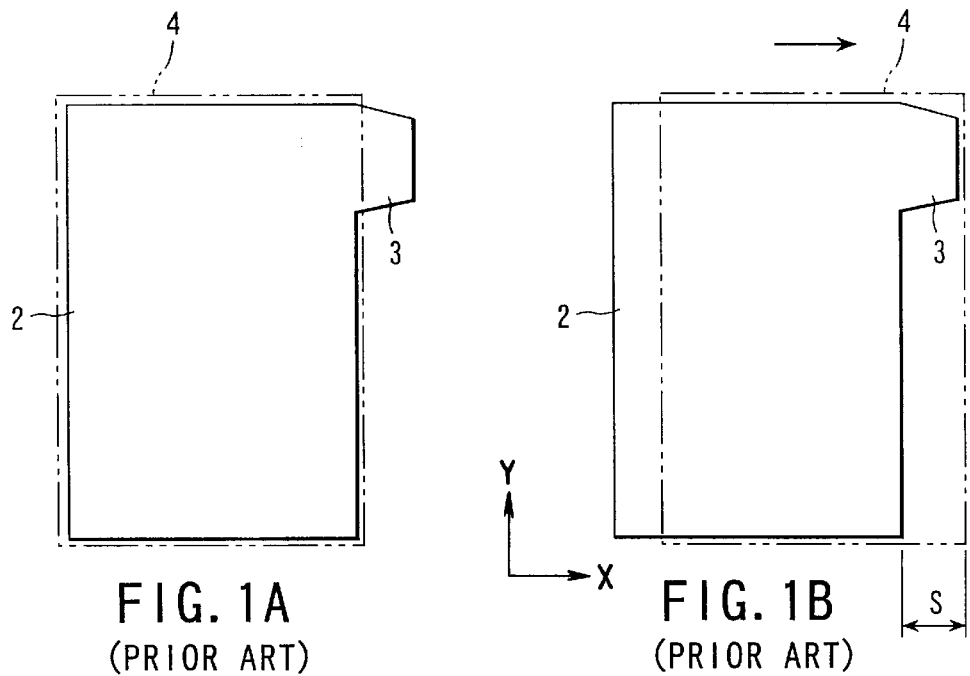
FIG. 1A (PRIOR ART)
FIG. 1B (PRIOR ART)
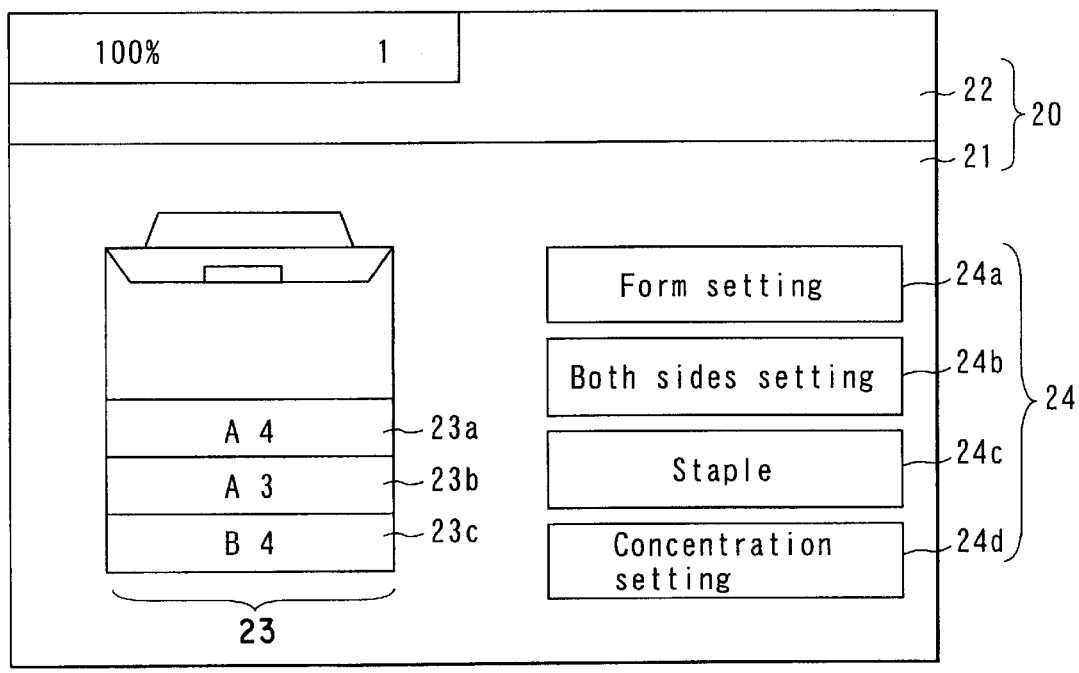
FIG. 3

IMAGE FORMING METHOD

BACKGROUND OF THE INVENTION

The present invention relates to an image forming method for printing an image on a tab of a sheet of paper by use of an image forming apparatus such as a digital copying machine.

The tab refers to a marginal portion of a sheet of paper, which extends off the normal image formation region of the sheet. It is thus impossible to print an image on the tab under predetermined setting modes of a copying machine. To print an image on the tab, the "image shift method" has been used hitherto, which is described in U.S. Pat. No. 5,210,622 (corresponding to Jpn. Pat. Appln. KOKAI Publication No. 4-298369).

The conventional image shift method will now be described with reference to FIGS. 1A and 1B. In the first place, a user places an original document with a tab (hereinafter referred to as a "tabbed document" or "tabbed sheet") on the document glass of a copying machine. As a second step, the user inputs a paper size by touching an initial menu displayed on the operation panel of the copying machine, thereby setting an image-printing region at a standard-size region. More specifically, when an A4-size original document 2 is used, an image-printing region 4 is set to A4 size, as shown in FIG. 1A. At this time, the image-printing region 4 does not include a tab 3 since the tab 3 is located outside the region 4.

Subsequently, the user selects a tab-printing mode to change the initial menu on the operation panel to a tab-print setting menu. The user inputs the position and size of the tab 3 in a printing-job command on the tab-print setting menu. The position of the tab 3 thus set determines the direction in which the image-printing region 4 is to be shifted. The size of the tab 3 thus set determines the shift amount of the image-printing region 4. As a result, the image-printing region 4 is shifted rightward (X direction) by a distance S, as shown in FIG. 1B, whereby the image-printing region 4 includes the tab 3. The image of the tab 3 is read by a scanner and processed in an image-processing section. The image is printed (copied) on a tab 3 of another sheet of paper (copy sheet) by an image formation section (including light exposure, development, and fixing units) based on the image processing data.

However, the conventional image shift method has the following disadvantages. First, the user must input the shift amount S and the shift direction (position) of the image-printing region 4 through the operation panel every time printing is performed.

Second, if the image-printing region of an A4-size document is shifted by 15 mm, a 15 mm-region having no image printed thereon is left on the sheet at the opposite side to the tab 3.

Third, since the length (along Y-direction) of the tab 3 is not given, the user must prepare an original document so as to print a desired image on the tab 3. In this case, the user also controls the printing position himself. In short, the conventional image shift method requires cumbersome work in addition to the operations performed on the operation panel, reducing practicability (serviceability) of the conventional image shift method.

BRIEF SUMMARY OF THE INVENTION

An object of the present invention is to provide an image formation method having an excellent practicability, which allows the user to directly input an image to be printed on a tab through an operation panel.

The image formation method according to the present invention comprises:

(a) displaying an initial menu on an operation panel, allowing selection of a cassette on the initial menu and pressing of a paper-form setting button to display a second menu;

(b) allowing pressing of a tab button on the second menu to set a sheet-form of the cassette selected above so as to correspond to the "tab", and displaying a third menu;

(c) allowing pressing of a tab-layout button on the third menu to determine a layout of the tab heading to be printed on the tab portion of the paper, and further allowing pressing of an input button to display a fourth menu or a setting button to display a fifth menu;

(d) allowing input of contents of the tab heading on the fourth menu, allowing pressing of an input-termination button to return to the third menu, and allowing pressing of a setting termination button of the third menu to terminate the input of the tab heading;

(e) allowing setting of a tab-size and the number of tabs on the fifth menu, allowing pressing of a setting-termination button to return to the third menu, and allowing pressing of the setting-termination button on the third menu to terminate setting of the tab; and (f) printing the tab heading on the tab portion of the paper based on the layout of the tab heading, the contents of the tab heading, the tab size, and the number of tabs.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1A is a schematic plan view showing an image-printing region before shift when an image is printed on a tab by a conventional image shift method;

FIG. 1B is a schematic plan view showing the image-printing region after shift when an image is printed on a tab by the conventional image shift method;

FIG. 3 is an illustration showing an initial menu of an input operation panel;

DETAILED DESCRIPTION OF THE INVENTION

Now, preferred embodiments of the present invention will be explained with reference to the accompanying drawings.

Figure 2:
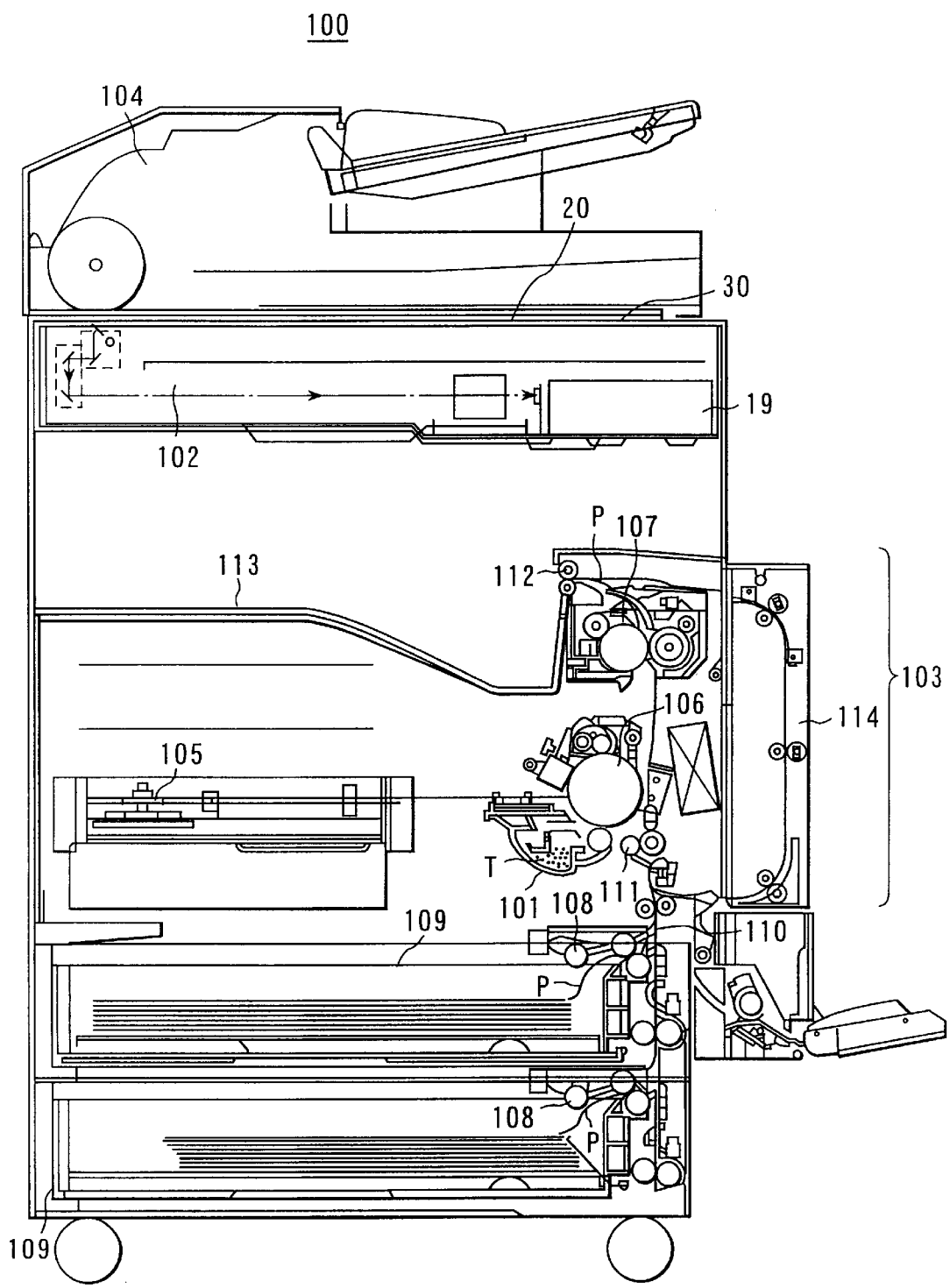
FIG. 2 is a perspective sectional view showing the entire structure of a digital copying machine serving as an image forming apparatus.

As shown in FIG. 2, a digital copying machine 100 comprises input operation panels 20, 30, a scanner 102, an image processing section 19, and an image forming section 103. The input operation panel has a liquid crystal display (LCD) 20 and a ten-key board 30. The display 20 is an input menu of an interactive touch-panel. The user can input items of "user setting" of a printing job by touching the panel while communicating with the menu display on the LCD 20. Furthermore, the user can input or cancel numerals by touching the ten-key board 30.

The scanner 102 reads out image data from an original document in the form of light and dark patterns, converts them into image signals which are further sent to the image-processing section 19. An automatic draft feeder (ADF) 104 is attached to the scanner 102. The ADF feeds an object (sheet) to be copied in synchronization with the read-out operation of the scanner 102.

The image-processing section 19 processes the image signals supplied from the scanner 102 or an apparatus (not shown) set outside the copying machine and simultaneously processes the data from the "user setting" input through the input operation panels 20 and 30. The image-processing section 19 houses an image controller (not shown) for displaying various types of menus on the LCD 20 of the input operation panel.

The image formation section 103 plays a role in forming an image on a sheet P based on the image-processing data supplied from the image-processing section 19. The image-forming section 103 comprises a light exposure apparatus 15, a photosensitive drum 106, a developing unit 101, and a fixing unit 107.

A light exposure apparatus 105 irradiates the photosensitive drum 106 with a laser beam which corresponds to image data supplied from the scanner 102 or the apparatus (not shown) set outside the copying machine. The photosensitive drum 106 holds the image corresponding to the laser beam supplied from the light exposure apparatus 105, as a latent image. The developing unit 101 comprises a development roller and a toner hopper to supply and fix a toner to the latent image on the photosensitive drum 106. A transfer unit transfers the toner image formed on the photosensitive drum 106 and developed in the development unit 101 onto the sheet P. The toner image thus transferred is heated to melt and fixed on the paper P by the fixing unit 107. Incidentally, a two-sided copy paper feeder 114 is provided for turning over the sheet P.

Next, the operational procedure for inputting letters into the tab will be described with reference to FIGS. 3–7.

(1) Initial Setting (Initial Menu)

FIG. 3 is a view showing an initial menu displayed on the LCD 20 of the input operation panel. The initial menu, which is also used when a regular copy is made, comprises an option-display portion 21 and a magnification display portion 22. A cassette selecting portion 23 and the paper-selecting portion 24 are displayed on the option-display portion 21. A copy-magnification and the number of copy sheets are displayed on the magnification display portion 22.

The cassette-selecting portion 23 comprises three selection buttons (touch panels) 23a–23c. When an upper-stage button 23a is pressed, an upper cassette storing A4 size sheets is selected. When a middle-stage button 23b is pressed, a middle-stage cassette storing A3 size sheets is selected. When a lower-stage button 23c is pressed, a lower-stage cassette for storing B4 size sheets is selected.

The sheet-selecting portion 24 comprises four setting buttons 24a–24d. The upper-stage, the second stage, the third stage, and the fourth stage buttons 24a, 24b, 24c and 24d are respectively used for setting paper-form, two-sided copy, stapling, and concentration adjustment.

When an image is printed on an A4 tabbed sheet, the settings on the initial menu are performed as follows.

The user presses the upper-stage button 23a to highlight the display of an A4 cassette. Subsequently, the user presses the paper-form setting button 24a, thereby setting the A4 cassette at a tab-form. By these input operations, signals are sent to an image-controller (not shown) of the image-processing section 19. When the image-controller receives the signals, an original document 2 is recognized as a tabbed sheet, and then, the image-printing region 4 is enlarged from A4 size to (A4+S) size where S is a size of the tab.

(2) Setting of Paper Size (Second Menu)

Figure 4:
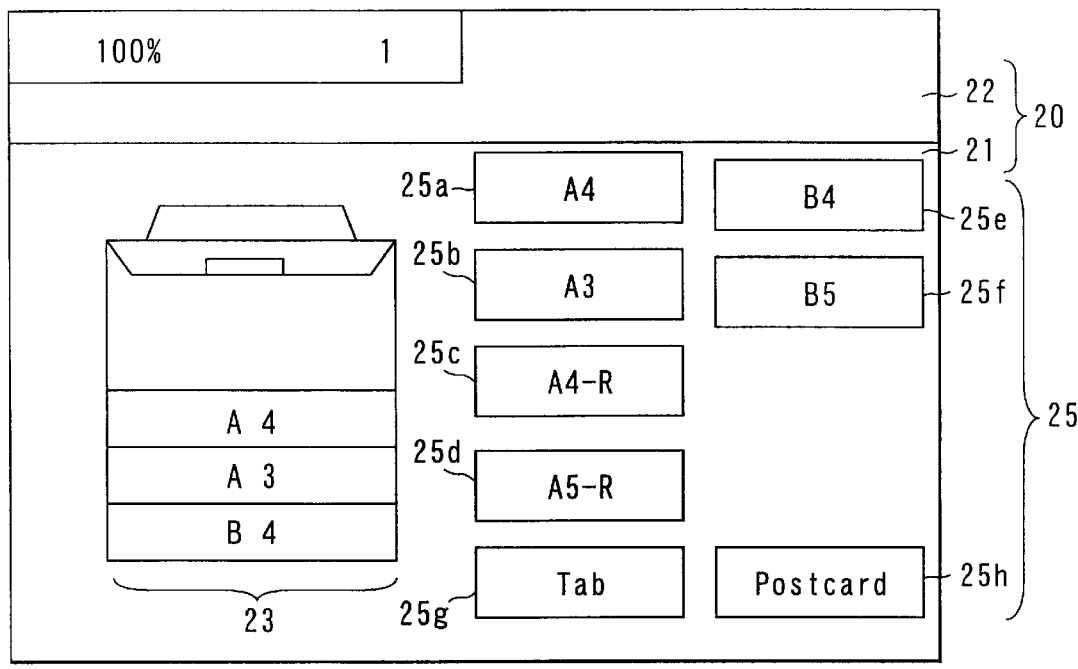
FIG. 4 is an illustration showing a paper-size/form setting menu (second menu) of the input operation panel.

FIG. 4 shows a paper-size setting menu displayed on the LCD 20 of an input operation panel. When the user presses a paper-form setting button 24a of an initial menu display, a second menu appears. On the second menu, the user chooses and presses one of an A4 button 25a, an A3 button 25b, an A4-R button 25c, an A5-R button 25d, a B4 button 25e, an A5 button 25f, a tab button 25g, and a post-card button 25h to change the sheet-form of the cassette selected on the initial menu. In this embodiment, a tab button 25g is pressed to set the sheet-form of the A4 cassette at the tab-form.

(3) Tab Display (Third Menu)

Figure 5:
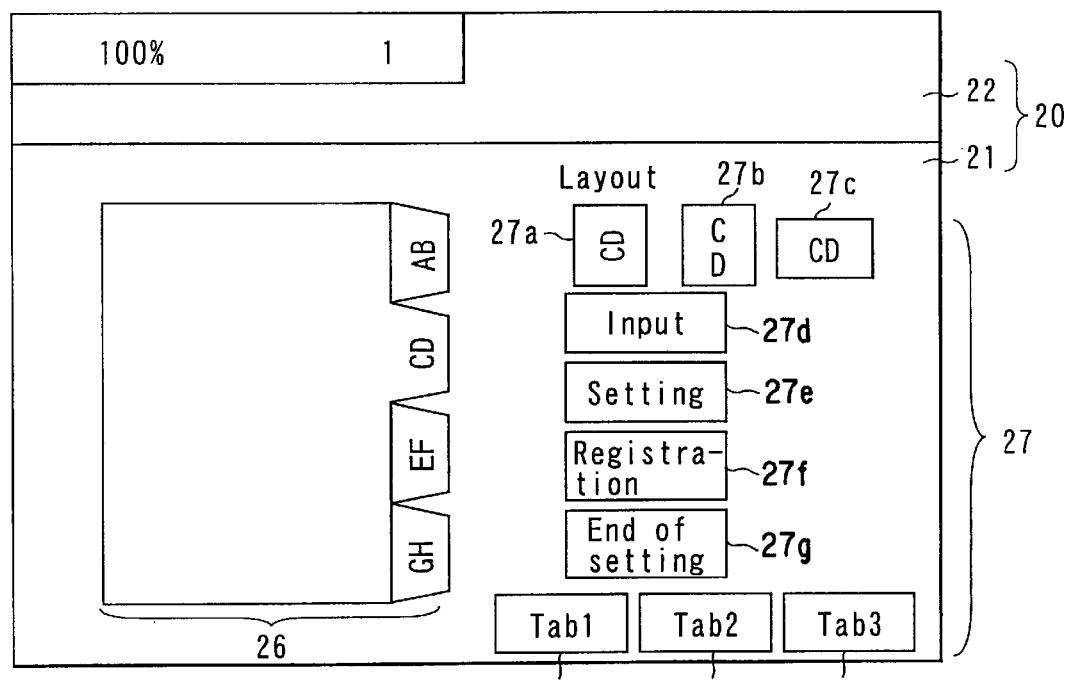
FIG. 5 is an illustration showing a tab-setting menu (third menu) of the input operation panel.

FIG. 5 is a view showing a tab display menu displayed on the LCD 20 of the input operation panel. When the user presses the tab button 25g on the second menu, the third menu appears. The third menu has a tabbed sheet display portion 26, tab layout buttons 27a–27c, input button 27d, setting button 27e, registration button 27f, setting-complication button 27g, and registered tab calling buttons 27h–27i (tab 1 to tab 3).

The tabbed sheet display portion 26 in the figure has four tabs. This menu, for the first time, made it possible to input the letters to be printed on first to fourth tabs. A desired tab is selected by operating the tabbed sheet display portion 26 and any one of tab layout buttons 27a–27c. When the user selects the desired tab, a letter-input menu for the desired tab is displayed to allow letters to be input. The layout of letters to be printed on the tab, such as a top-to-bottom printing layout and a left-to-right printing layout can be selected on this menu. The user can confirm actual printing state of letters on the tab through a preview displayed on the sheet display portion 26. The user can select a desired printing layout from a top-to-bottom printing layout, a left-to-right printing layout, and 90° anti-clockwise rotation layout of the left-to-right printing layout, by pressing one of the tub layout buttons 27a to 27c.

When letters are input into a tab, the user highlights a desired tab on the menu and presses the input button 27d. A letter-input menu (fourth menu) appears.

When the size of the tab is set, the user presses a setting button 27a. A tab-setting menu (fifth menu) then appears.

Frequently used tab-headings can be registered in advance. The registered headings can be called up as needed and allowed to adhere to any portion of the menu. When the tab heading is registered, the user presses a registration button 27f. At most three headings can be registered in this embodiment. When a registered heading is called up, the user presses one of a tab 1 button 27h, a tab 2 button 27i, and a tab 3 button 27j displayed at the lower portion of the menu.

When the user presses a setting-completion button 27g to terminate the setting, the initial menu of FIG. 3 appears.

(4) Letter Input (Fourth Menu)

Figure 6:
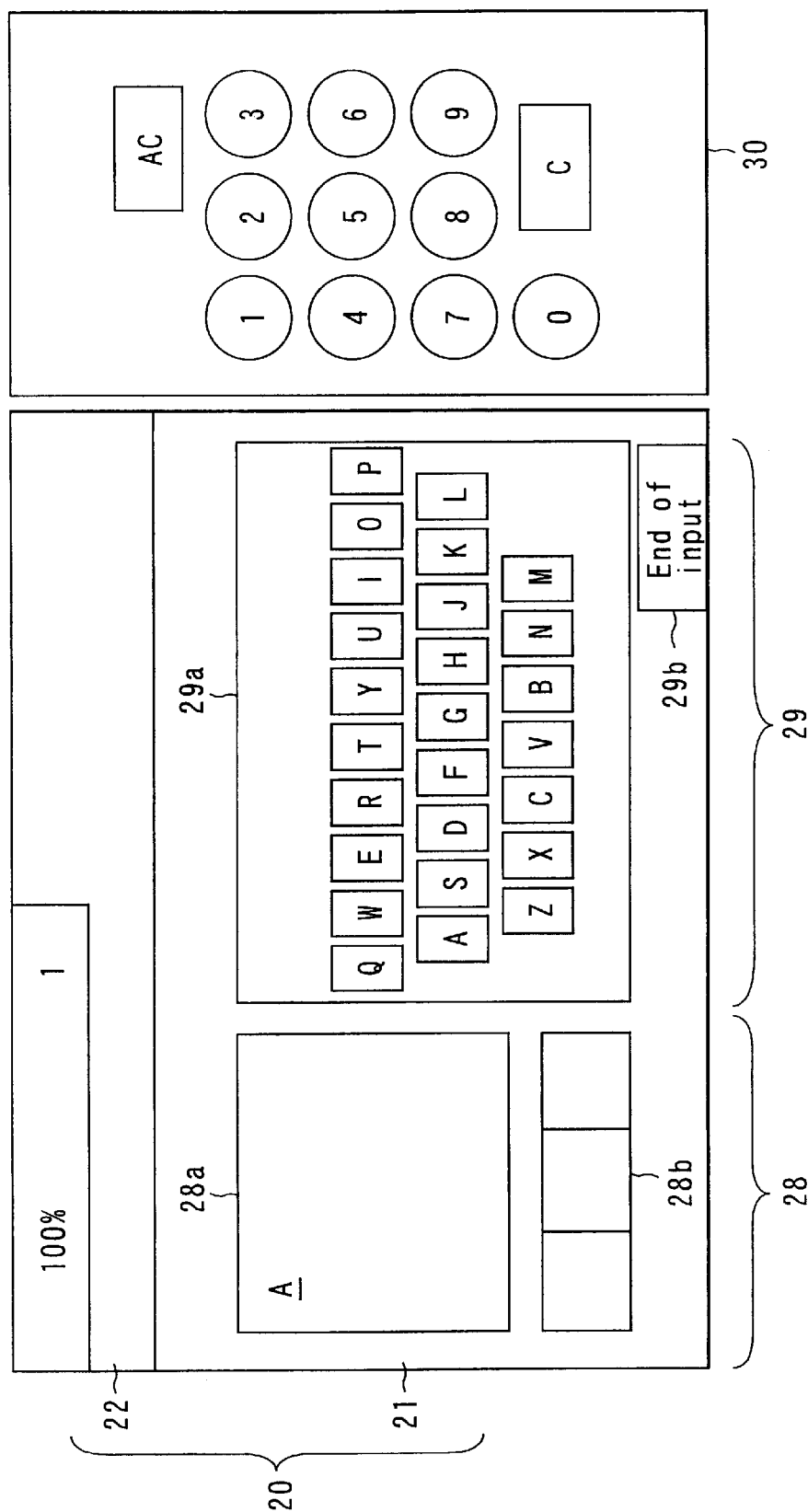
FIG. 6 is an illustration showing a letter-input menu (fourth menu) of the input operation panel.

FIG. 6 is a view showing a letter-input menu and a ten-key board 30 displayed on the LCD 20 of the input operation panel. When the user presses the input button 27d on the third menu, the fourth menu of FIG. 6 appears. In the fourth menu, a letter display portion 28a a letter input pad 28b, an input keyboard 29a, and an input termination button 29b are displayed.

The user can input letters and numerals by means of the input keyboard 29a or the ten-key board 30, as is the case with a personal computer. If a tab heading is written by alphabetic characters, the user presses desired alphabet characters of the input keyboard 29a. The letters thus input are displayed on the letter display portion 28a. Symbols can be input in the same way. The user displays a list of symbols on the menu and selects a desired one under visual observation. When numerals are input, the ten-key board 30 is used. When Chinese characters are input, the user changes the display of the input keyboard 29a to an alphabet or katakana mode (the angular Japanese phonetic syllabary) and input appropriate letters and converted them into the Chinese characters in the same way as a word processor.

Furthermore, letters and symbols are input by handwriting as is the case with an electronic notepad. The user writes the letters and symbols on the letter input pad 28b to input the tab heading.

Upon completion of the tab heading input operation, the user presses an input completion button 29b to finish the fourth menu. Note that the size of a letter can be automatically adjusted by the image-processing section 19 so as to fall within the printing-allowable range. The size of the letter may be manually adjusted by the user. In the case of a symbol and a pattern which cannot be input by means of input operation panels 20, 30, the images of the symbol and pattern are read by a scanner and the scanned data are processed by the image-processing section 19 into forms capable of transferring to the image forming section 103.

When the input termination button 29b is pressed, the third menu of FIG. 5 appears.

(5) Tab Setting (Fifth Menu)

Figure 7:
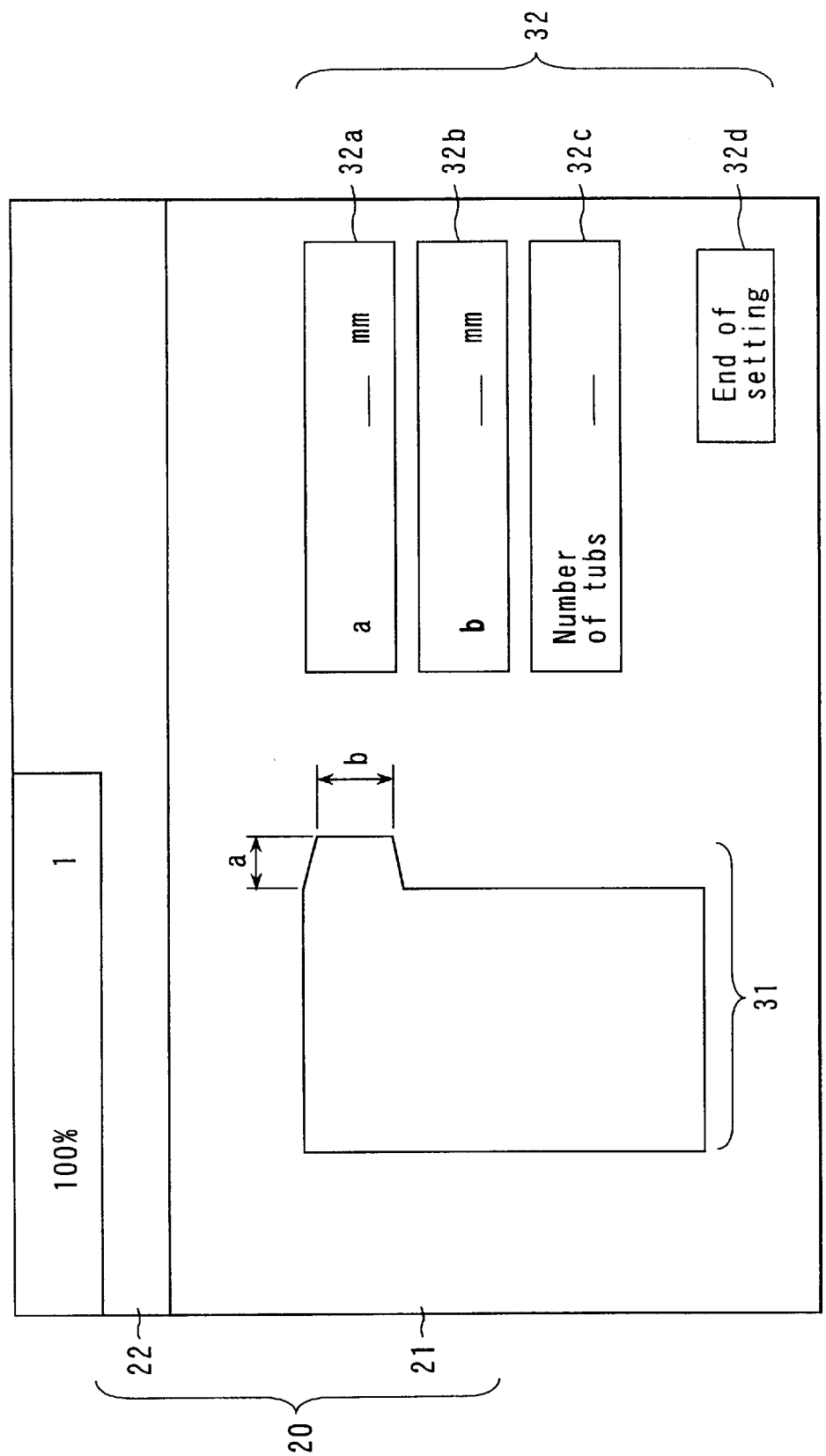
FIG. 7 is an illustration showing a tab-setting menu (fifth menu) of the input operation panel.

FIG. 7 is a tab-setting menu displayed on the LCD 20 of the input operation panel. The user presses the setting button 27e on the third menu to display a fifth menu. On the fifth menu, a tabbed sheet display portion 31, a tab-width input portion 32a, a tab-length input portion 32b, a tab-number input portion 32c, and a setting-completion button 32d are displayed. The user inputs the size of a tab (width a and length b) and the number of tabs by use of a ten-key board 30.

It is satisfactory for the user to input only the tab width a and the tab number n. It is not necessary to input the length b of the tab. This is because if the paper size L (A4) and the number n of tabs are known, the length b of each tab can be automatically determined.

Upon completion of the tab setting, the user presses a setting-termination button 32d. The third menu of FIG. 5 then appears.

When all setting operations are completed, the user presses the setting completion button 27g of the third menu to return the display to the initial menu in place of the LCD menu. When the setting completion button 27g is pressed, a setting completion signal is sent to the computer of the image processing section 19. The computer, upon receiving a setting termination signal, outputs a signal based on the setting data previously input into the image-forming section 103. In this manner, the image-forming section 103 prints a desired tab heading accurately on the tab 3.

According to the present invention, the user inputs a desired tab heading (image) on a tab directly through the operation panel. Therefore, images can be printed not only on a regular region (e.g., normal A4-size region) of a sheet but also on the tab. Note that, according to a conventional image shift method, if an A4 original document is shifted by 15 mm, a region (15 mm) having no image printed thereon is left in the paper on the leading edge side.

According to the present invention, it is not necessary for the user to prepare an original document by taking the position of a tab into account, unlike a conventional case. Also, it is not necessary to align the position of the original document with a desired printing-output portion. The present invention makes it easier for the user to input the tab-setting operation, greatly improving the practicability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image formation method for printing a tab heading on a tab portion of a paper comprising:
   (a) displaying an initial menu on an operation panel, allowing selection of a cassette on the initial menu and pressing of a paper-form setting button to display a second menu;
   (b) allowing pressing of a tab button on the second menu to set a sheet-form of the cassette selected above so as to correspond to the "tab", and displaying a third menu;
   (c) allowing pressing of a tab-layout button on the third menu to determine a layout of the tab heading to be printed on the tab portion of the paper, and further allowing pressing of an input button to display a fourth menu or a setting button to display a fifth menu;

(d) allowing input of contents of the tab heading on the fourth menu, allowing pressing of an input-termination button to return to the third menu, and allowing pressing of a setting termination button of the third menu to terminate the input of the tab heading;

(e) allowing setting of a tab-size and the number of tabs on the fifth menu, allowing pressing of a setting-termination button to return to the third menu, and allowing pressing of the setting-termination button on the third menu to terminate setting of the tab; and (f) printing the tab heading on the tab portion of the paper based on the layout of the tab heading, the contents of the tab heading, the tab size, and the number of tabs.

2. The method according to claim 1, wherein, in step (c), the tab heading is input by calling the tab heading registered in advance without switching the display from the third menu to the fifth menu.

3. The method according to claim 1, wherein, in the step (d), the tab heading is input by means of alphabet key board displayed on the fourth menu.

4. The method according to claim 1, wherein, in said step (d), the tab heading is input by handwriting on a letter input pad displayed on the fourth menu.

5. The method according to claim 1, wherein, in said step (d), the tab heading is input by means of a ten-key board except for a ten-key board displayed on the fourth menu.

6. The method according to claim 1, wherein, in said step (d), the tab heading is input in the form of an image by allowing a scanner to scan of the image of the tab heading.

7. The method according to claim 1, wherein, in said step (e), the width and length of a tab and the number of tabs are set.

8. The method according to claim 1, wherein, in said step (e), only the number of tabs and the width of each of the tabs are set without setting the length of the tab.

9. The method according to claim 1, wherein, in said third menu, a plurality of sheets with a tab are displayed.

* * * * *